(12) United States Patent
Oezkan et al.

(10) Patent No.: US 7,891,682 B2
(45) Date of Patent: Feb. 22, 2011

(54) MOTOR VEHICLE

(75) Inventors: Ali Oezkan, Leonberg (DE); Oliver Moessinger, Forst (DE); Thomas Hunn, Renningen (DE); Kay Lorenz, Olbernhau (DE); Klaus Bohnert, Muehlacker (DE); Marco Ujhasi, Renningen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 140 days.

(21) Appl. No.: 12/264,286

(22) Filed: Nov. 4, 2008

(65) Prior Publication Data

US 2009/0134669 A1   May 28, 2009

(30) Foreign Application Priority Data

Nov. 24, 2007   (DE) ........................ 10 2007 056 674

(51) Int. Cl.
    *B60G 7/02*   (2006.01)
(52) U.S. Cl. ............................................. 280/124.109
(58) Field of Classification Search .................. 280/785, 280/788, 124.109; 180/311, 312; 296/195, 296/203, 204
    See application file for complete search history.

(56) References Cited

U.S. PATENT DOCUMENTS

| 5,042,837 | A | 8/1991 | Kleinschmit et al. |
| 5,071,188 | A | 12/1991 | Thum |
| 5,074,587 | A | 12/1991 | Schwede et al. |
| 5,280,957 | A | 1/1994 | Hentschel et al. |
| 5,466,005 | A | 11/1995 | Kohlmeier et al. |
| 5,797,647 | A | 8/1998 | Mehrkens et al. |
| 7,090,290 | B2 | 8/2006 | Neumeier et al. |

FOREIGN PATENT DOCUMENTS

| DE | 39 05 650 C2 | 1/1990 |
| DE | 40 30 921 A1 | 4/1991 |
| DE | 42 44 216 C2 | 6/1994 |
| DE | 43 18 226 A1 | 12/1994 |
| DE | 43 29 532 A1 | 3/1995 |
| DE | 195 32 531 A1 | 3/1997 |
| DE | 196 06 506 A1 | 8/1997 |
| DE | 102 14 372 C1 | 7/2003 |
| DE | 10 2004 018 977 A1 | 11/2005 |
| DE | 10 2004 044 476 A1 | 4/2006 |
| DE | 10 2006 047 511 A1 | 4/2007 |
| DE | 10 2005 055 978 A1 | 5/2007 |
| DE | 10 2006 017 225 A1 | 10/2007 |
| EP | 0 393 397 A1 | 10/1990 |

OTHER PUBLICATIONS

German Patent and Trademark Search Report, dated Jun. 25, 2008.

*Primary Examiner*—Faye M. Fleming

(57) ABSTRACT

A motor vehicle has a rear axle cross member, from which two diagonal struts project forward in a V-shape, which diagonal struts are connected with their front end in each case to a vehicle longitudinal member. Here, it is important that an annular, closed stiffening structure is provided behind the rear axle cross member as viewed in the direction of travel. The stiffening structure is supported with its front end on the rear axle cross member and with its rear end, via struts which project rearward in a V-shape, on rear vehicle longitudinal members.

12 Claims, 2 Drawing Sheets

MOTOR VEHICLE

CROSS-REFERENCE TO RELATED APPLICATION

This application claims the priority, under 35 U.S.C. §119, of German application DE 10 2007 056 674.5, filed Nov. 24, 2007; the prior application is herewith incorporated by reference in its entirety.

BACKGROUND OF THE INVENTION

Field of the Invention

The present invention relates to a motor vehicle having a rear axle cross member, from which two diagonal struts project forward in a V-shape.

Published, non-prosecuted German patent DE 10 2004 018 977 A1 discloses a generic motor vehicle whose underbody region is assigned at least two stiffening struts which run so as to converge, in each case from a body connection, with a component in the direction of a vertical longitudinal central plane. Arranged freely below the underbody and with a spacing to the latter is a connecting carrier, on which the struts are held with a close spacing with respect to the vehicle transverse direction, and two further struts which extend from there in each case with a component in the direction away from the vertical longitudinal central plane. This is intended in particular to improve the torsional stiffness of the motor vehicle about the vehicle longitudinal axis.

German patent DE 102 14 372 C1, corresponding to U.S. Pat. No. 7,090,290 B2, discloses a further motor vehicle in which a base of the body is stiffened by V-shaped stiffening struts.

Further devices for stiffening a motor vehicle body are known for example from German patent DE 39 05 650 C2, corresponding to U.S. Pat. No. 5,074,587, from European patent EP 0 393 397, corresponding to U.S. Pat. No. 5,042,837, from German patent DE 43 18 226 C2, from published, non-prosecuted German patent application DE 43 29 532 A1 and from German patent DE 42 44 216 C2.

SUMMARY OF THE INVENTION

It is accordingly an object of the invention to provide a motor vehicle that overcomes the above-mentioned disadvantages of the prior art devices of this general type, in which it is possible to realize particularly effective stiffening, in particular with regard to torsion about the vehicle longitudinal axis.

The invention is based on the general concept of disposing a closed, annular stiffening structure in the underbody region between a rear axle cross member and a V-shaped stiffening bar, and thereby generating a torsion-shear field. The rear axle cross member has two diagonal struts which project forward in the direction of travel in a V-shape and which are connected with their front end in each case to a vehicle body, in particular to a vehicle longitudinal member, and with their rear end in each case to the rear axle cross member. Here, the annular, closed stiffening structure is arranged behind the rear axle cross member as viewed in the direction of travel, and is connected or supported with its front end to or on the rear axle cross member, while being supported with its rear end, via the abovementioned struts which project rearward in a V-shape, on rear vehicle longitudinal members. The annular, closed stiffening structure according to the invention serves to create a shear field which considerably increases torsional stiffness in comparison with conventional diagonal struts, which shear field brings about in particular an increase in the dynamic torsional and bending stiffness, and considerable stiffening of the rear end of the motor vehicle. In particular, by a stiffening structure of this type, it is possible for external excitations of vibrations which occur during driving, for example when travelling over uneven sections of roadway, which can adversely affect driving safety or at least driving comfort, to be considerably reduced. Here, a stiffening structure according to the invention is highly advantageous in particular for use in so-called cabriolets with a self-supporting body, which has a reduced level of stiffness on account of the non-rigid roof.

The annular, closed stiffening structure is expediently connected, in particular screwed, to the rear axle cross member from below. The optional variant of the screw connection of the stiffening structure to the rear axle cross member in particular offers the possibility of retroactive assembly of the stiffening structure on the rear axle cross member which is already fastened to the body, as a result of which servicing, or in the event of repairs, an exchange, of the stiffening structure can also be made considerably easier. In production, too, it is thereby possible to make a simple differentiation between coupe and cabriolet.

In a further advantageous embodiment of the solution according to the invention, the annular, closed stiffening structure is formed from a tetragonal tube composed of steel. Hollow cross sections as are formed for example by a tetragonal tube have a high level of bending and torsional stiffness, and are thereby particularly suitable for use as stiffening components. At the same time, it is possible by use of hollow cross sections of this type to considerably reduce weight in relation to solid profiles, which is highly advantageous in particular in sportscar construction. Although steel has a relatively high specific weight, it also has a high level of strength, such that the required stiffening action can be obtained even with relatively thin-walled hollow steel profiles. The stiffening structure may also be produced from other weldable materials (for example aluminum).

The stiffening structure can expediently be used, or is expediently formed, as a carrier for an underbody lining. The underbody lining, which has a not inconsiderable influence on the aerodynamics and therefore on the driving behavior of the motor vehicle, must be reliably fastened from below to the body of the motor vehicle. For this purpose, a plurality of fastening points are necessary, which under some circumstances are difficult to reach depending on the jaggedness of the underbody. The annular, closed stiffening structure, which runs substantially parallel to a roadway or to an underbody of the motor vehicle, offers a plurality of possible connecting points for fastening an underbody lining to the motor vehicle. The stiffening structure therefore offers not only improved stiffening of the body, but rather also the possibility of being able to easily fasten individual underbody lining parts to the motor vehicle.

It is self-evident that the features specified above and the features yet to be explained below can be used not only in the combination specified in each case but rather also in other combinations or individually without departing from the scope of the present invention.

Preferred exemplary embodiments of the invention are illustrated in the drawings and are explained in more detail in the following description, with identical reference symbols relating to identical or similar or functionally equivalent components.

Other features which are considered as characteristic for the invention are set forth in the appended claims.

Although the invention is illustrated and described herein as embodied in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
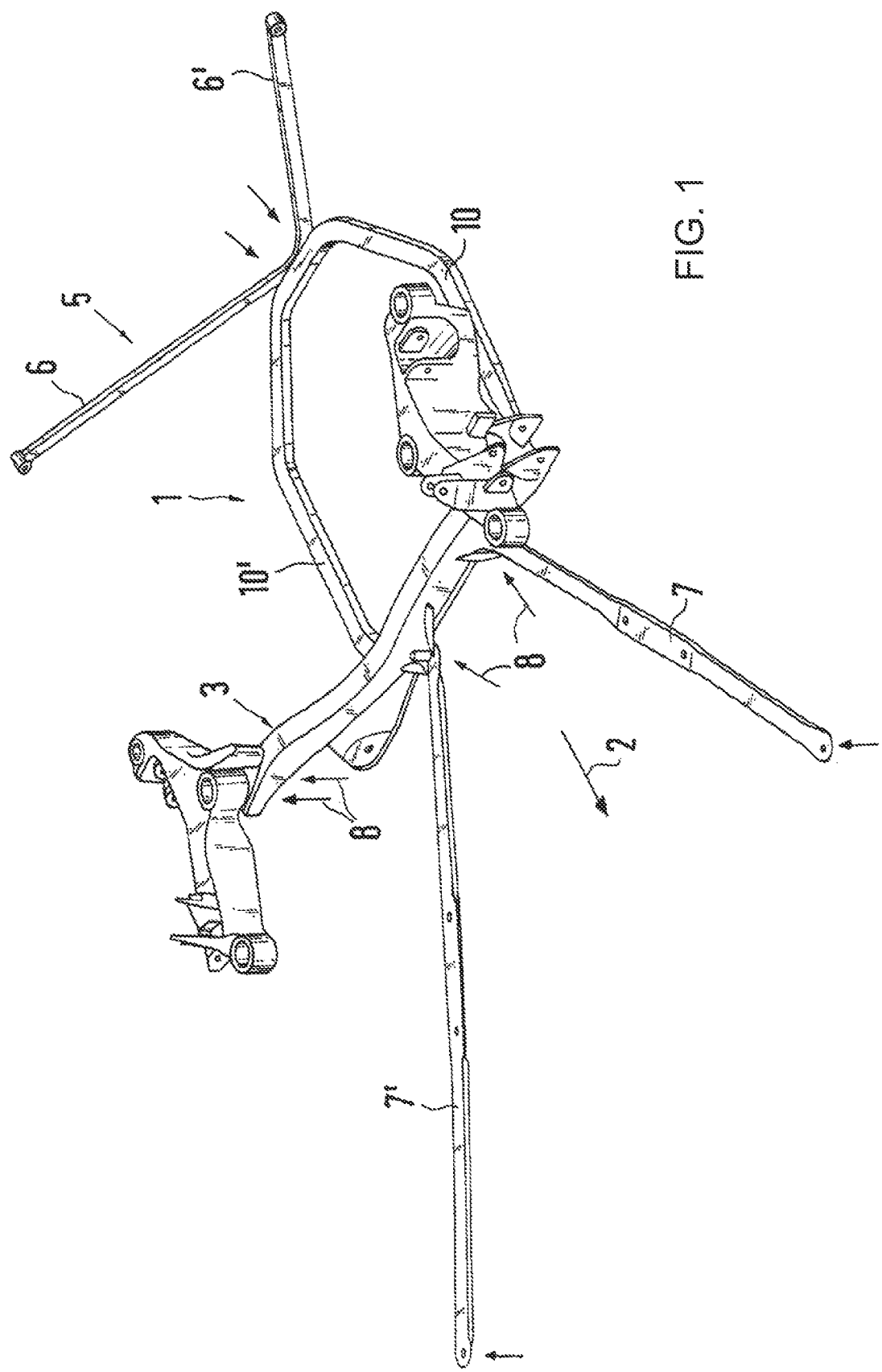
FIG. 1 is a diagrammatic, perspective view of a stiffening structure according to the invention.

Referring now to the figures of the drawing in detail and first, particularly, to FIG. 1 thereof, there is shown a stiffening structure 1 according to the invention that is of a closed, annular configuration. With its front end in a direction of travel 2 (compare FIG. 2), the stiffening structure 1 is connected to a rear axle cross member 3 of a motor vehicle 4 (in this regard, compare FIG. 2). With its rear end in the direction of travel 2, the stiffening structure 1 is connected to a V-shaped bar 5 which has two diagonally projecting struts 6 and 6'.

At its ends which face in each case away from the stiffening structure 1, the two diagonally projecting struts 6, 6' are connected to a body structure, in particular to rear vehicle longitudinal members.

Two diagonal struts 7 and 7' project forward from the rear axle cross member 3 in the direction of travel 2, which diagonal struts 7 and 7' are connected with their rear end in each case to the rear axle cross member 3 and with their front end in each case likewise to a body structure, in particular to lateral sills. Here, the stiffening structure 1 forms, directly behind the rear axle cross member 3 in the direction of travel 2, a shear field which increases the torsional stiffness, as a result of which in particular vibrations which occur during driving of the motor vehicle are intended to be damped. In particular, it is intended in this way to increase driving safety and driving comfort of the motor vehicle 4 which is fitted with the stiffening system 1 according to the invention.

The stiffening structure 1 may be connected to the V-shaped bar 5 and to the rear axle cross member 3, for example by screws, with the stiffening structure 1 being screwed at its front end to the rear axle cross member 3 from below. In the same way, the two diagonal struts 7, 7' may also be fastened to the rear axle cross member 3 and to the body structure of the motor vehicle 4.

The V-shaped bar 5 may be formed in one piece, that is to say with struts 6 and 6' which are fixedly connected to one another, with it also being conceivable for the two struts 6, 6' to be formed separately from one another and to be connected, in particular screwed, separately to the rear end of the stiffening structure 1.

In order to obtain as high a degree of stiffness as possible, the annular, closed stiffening structure 1 is formed from an encircling, hollow cross-sectional profile, in particular from a tetragonal tube composed of steel. Hollow cross sections of this type have a particularly high level of bending stiffness on account of their large geometrical moment of inertia and their resistance moment, with a simultaneously low weight. The latter aspect in particular is of particular significance in the construction of sportscars. The hollow cross-sectional profile may however also be round, oval, triangular or polygonal in cross section.

Figure 2:
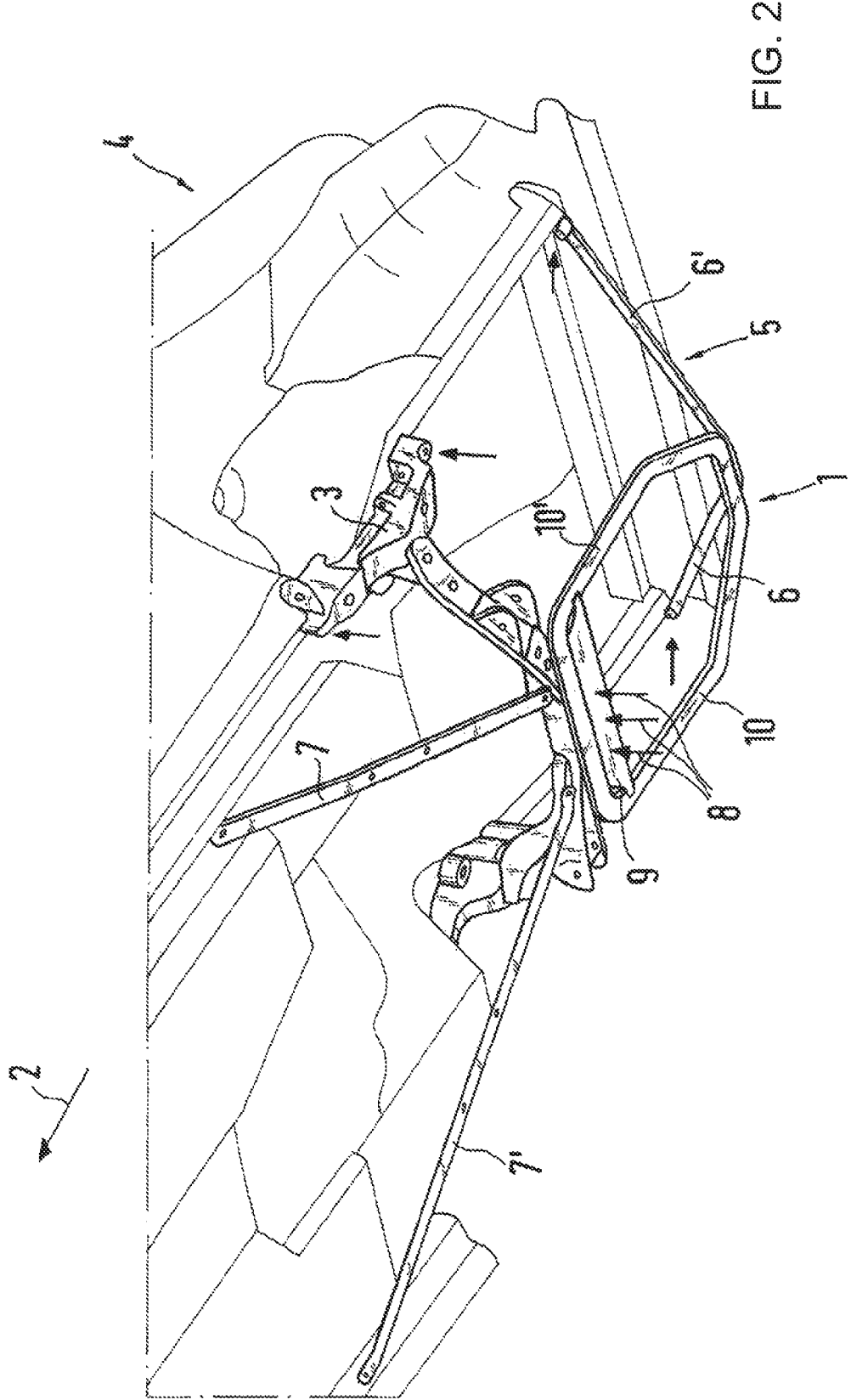
FIG. 2 is a diagrammatic, perspective view of the stiffening structure which is arranged on a motor vehicle.

FIG. 2 shows the stiffening structure 1 according to the invention installed on the motor vehicle 4, with the three parallel arrows 8 indicating a possible screwing direction for fastening the stiffening structure 1 to the rear axle cross member 3.

As can be seen from FIG. 2, the stiffening structure 1 runs substantially parallel to an underbody of the motor vehicle 4, and therefore substantially parallel to a roadway when the motor vehicle 4 is subsequently fully assembled. On account of this fact, the stiffening structure 1 may serve as a carrier for a non-illustrated underbody lining which considerably simplifies the fastening of an underbody lining of this type, or parts thereof, in relation to the fastening to the rest of the underbody. Since the underbody lining is intended not only to offer protection of the underbody from damage but also to perform important aerodynamic functions, the reliable connection of an underbody lining of this type is of particular significance. Such a reliable connection to a conventionally extremely jagged underbody is however sometimes difficult, such that the stiffening structure 1 likewise considerably facilitates the attachment of the underbody lining.

As can also be seen from FIG. 2, the stiffening structure 1 may have further stiffening elements 9 which have an additional stiffening action. A stiffening element 9 of this shown in FIG. 2 in the front end region of the stiffening structure 1, and extends in the vehicle transverse direction in this example. The stiffening element 9 may for example be welded to the annular, closed stiffening structure 1.

Considering the shape of the stiffening structure 1 more closely, it is apparent that the stiffening structure 1 has, in its front region, a region which runs substantially transversely with respect to the direction of travel 2, and adjoining the region to the rear, counter to the direction of travel 2, two lateral regions 10 and 10' which run parallel to the direction of travel 2. It is conceivable here for further non-illustrated stiffening elements to be provided in particular between the lateral regions 10 and 10'. Counter to the direction of travel 2, the stiffening structure 1 tapers, with the two lateral regions 10 and 10' converging on one another in the direction of the V-shaped bar 5 and opening out in a rear end region which extends transversely with respect to the direction of travel. In the end region, the stiffening structure 1 is fastened to the V-shaped bar 5 or to the individual struts 6 and 6', for example likewise by a screw connection. Here, a fastening of the stiffening structure 1 by use of a screw connection offers the great advantage that, in the event of servicing or a repair, the stiffening structure 1 is easy to exchange and therefore replace.

It is therefore possible with the stiffening structure 1 according to the invention to obtain effective stiffening of the motor vehicle 4, in particular if the motor vehicle 4 is embodied as a cabriolet, while simultaneously involving the simplest of handling, that is to say very simple assembly of the stiffening device 1 on the motor vehicle 4. By using hollow profiles, it is also possible to obtain a weight-optimized stiffening structure 1 which however has high stiffness values.

The invention claimed is:

1. A motor vehicle, comprising:
vehicle longitudinal members;
a rear axle cross member;

two diagonal struts directly connected to each other and projecting rearward in a V-shape, said diagonal struts having a front end connected in each case to one of said vehicle longitudinal members; and an annular, closed stiffening structure disposed behind said rear axle cross member as viewed in a direction of travel, said annular, closed stiffening structure having a front end supported on said rear axle cross member and a rear end, via said struts projecting rearward in said V-shape, on said rear vehicle longitudinal members.

2. The motor vehicle according to claim 1, wherein said annular, closed stiffening structure is connected to said rear axle cross member from below.

3. The motor vehicle according to claim 1, wherein said struts which project rearward in said V-shape are connected to one another in a region of said rear end of said annular, closed stiffening structure.

4. A motor vehicle, comprising:
vehicle longitudinal members;
a rear axle cross member;
two diagonal struts projecting rearward in a V-shape, said diagonal struts having a front end connected in each case to one of said vehicle longitudinal members; and
an annular, closed stiffening structure disposed behind said rear axle cross member as viewed in a direction of travel, said annular, closed stiffening structure having a front end supported on said rear axle cross member and a rear end, via said struts projecting rearward in said V-shape, on said rear vehicle longitudinal members, said annular, closed stiffening structure is formed from an encircling, hollow cross-sectional profile.

5. The motor vehicle according to claim 1, wherein said annular, closed stiffening structure is formed from a tetragonal tube composed of steel.

6. The motor vehicle according to claim 1, wherein said annular, closed stiffening structure is screwed with said rear end to one of said struts.

7. The motor vehicle according to claim 1, wherein said annular, closed stiffening structure is a carrier for an underbody lining.

8. The motor vehicle according to claim 1, further comprising an underbody and said annular, closed stiffening structure runs substantially parallel to said underbody.

9. The motor vehicle according to claim 1, wherein said annular, closed stiffening structure is reinforced at least at said front end connected to said rear axle cross member.

10. The motor vehicle according to claim 1, wherein said annular, closed stiffening structure tapers rearward, counter to the direction of travel, in a trapezoidal fashion.

11. The motor vehicle according to claim 1, wherein said annular, closed stiffening structure is screwed to said rear axle cross member from below.

12. The motor vehicle according to claim 3, wherein said struts are formed as a continuous single-piece configuration.

* * * * *